United States Patent Office 2,957,896
Patented Oct. 25, 1960

2,957,896

1-(OXYGENATED BUTYL)-2-OXYGENATED 1,2,3,4, 4a, 4b, 5, 6, 7, 9,10,10a - DODECAHYDROPHENAN- THREN-7-ONES AND INTERMEDIATES

William F. Johns, Morton Grove, Ill., assignor to G. D. Searle & Co., Chicago, Ill., a corporation of Delaware No Drawing. Filed Nov. 20, 1959, Ser. No. 854,239

6 Claims. (Cl. 260—397.45)

The invention described herein relates to novel dodecahydrophenanthren-7-ones and, more particularly, to 1-(oxygenated butyl)-2-oxygenated 1,2,3,4,4a,4b,5,6,7,9,10, 10a-dodecahydrophenanthren-7-ones of the structural formula

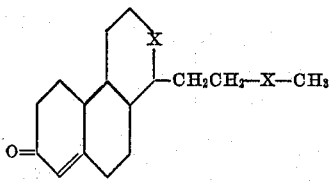

wherein X is selected from the group consisting of carbonyl, hydroxymethylene, and (lower alkanoyl)oxymethylene radicals. Also encompassed by this invention are novel intermediates in the manufacture of the aforementioned compounds.

A suitable starting material for the manufacture of the instant compounds is estradiol 3-methyl ether. Treatment of the latter ether with boric acid at elevated temperature followed by reaction with osmium tetroxide results in 3-methoxy-17β-methylgona-1,3,5(10) - triene-13α17α - diol. This gonatriene is reduced by means of lithium and liquid ammonia to afford 13α,17α-dihydroxy-17β-methylgon-4-en-3-one. The latter diol is cleaved with periodic acid to yield the instant 1-(3-oxobutyl)-1,2,3,4,4a,4b,5,6,7,9,10, 10a-dodecahydrophenanthrene-2,7-dione.

When estradiol 3-methyl ether is treated first with boric acid in the manner described supra, then with ozone, ring cleavage occurs to produce 7-methoxy-1-(3-oxobutyl)-1,2,3,4,4a,9,10,10a-octahydrophenanthren-2-one. Reduction of this diketone with sodium borohydride in methanol affords 1-(3-hydroxybutyl)-7-methoxy-1,2,3,4,4a,9,10,10a-octahydrophenanthren-2-ol, which is converted to the instant 1-(3-hydroxybutyl)-2-hydroxy-1,2,3,4,4a,4b,5,6,7,9, 10,10a-dodecahydrophenanthren-7-one by reaction with lithium and ammonia.

Treatment of the aforementioned 1-(3-hydroxybutyl)-2 - hydroxy - 1,2,3,4,4a,4b,5,6,7,9,10,10a - dodecahydrophenanthren-7-one with lower alkanoic acid anhydrides results in the instant corresponding lower alkanoates. As a specific example, acylation of this diol with acetic anhydride in pyridine produces 1-(3-acetoxybutyl)-2-acetoxy - 1,2,3,4,4a,4b,5,6,7,9,10,10a - dodecahydrophenanthren-7-one.

The compounds of this invention are useful as a result of their valuable pharmacological properties. They have, for example, hormonal activity in consequence of their ability to potentiate the androgenic and anabolic activity of testosterone propionate. In addition to its use as an intermediate in the manufacture of the instant dodecahydrophenanthrenes, the aforementioned 13α,17α-dihydroxy-17β-methylgon-4-en-3-one also possesses the ability to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees Centigrade (°C). Quantities of materials are expressed in parts by weight unless otherwise noted.

3241′are,a t2α

Example 1

An intimate mixture of 30 parts of estradiol 3-methyl ether and 7.5 parts of boric acid is heated at 140–180° for about 20 minutes. The crude product is obtained from the reaction mixture by vacuum distillation, then dissolved in benzene, washed with aqueous potassium bicarbonate, dried over anhydrous magnesium sulfate, and evaporated to dryness in vacuo. To a solution of this residue in 105 parts of ether is added 8.9 parts of osmium tetroxide and the mixture allowed to stand at room temperature for about 18 hours. This hydroxylation mixture is diluted with 160 parts of ethanol and 5 parts of sodium sulfite, dissolved in 100 parts of water, heated at reflux for about one hour, filtered, and stripped of solvent at reduced pressure. The residue is extracted with benzene and the extract washed with water, dried over anhydrous magnesium sulfate, and concentrated to dryness in vacuo. The remaining material is recrystallized twice from acetone to afford 3-methoxy-17β-methylgona-1,3,5(10)-triene - 13α, 17α-diol, M.P. 181–182°; $[\alpha]_D = +117°$.

Example 2

A solution of one part of 3-methoxy-17β-methylgona-1,3,5(10)-triene-13α,17α-diol in 45 parts of tetrahydrofuran is added to 180 parts of liquid ammonia in 40 parts of tertiary butyl alcohol. To the resulting mixture is added 2 parts of lithium wire portionwise over a period of about 30 minutes, and this reaction mixture is stirred for about 3 hours. A solution of 8 parts of methanol in 44 parts of benzene is added to destroy the excess lithium, then the ammonia evaporated and the residue treated successively with benzene and water. The organic layer is separated, washed with water, dried over anhydrous magnesium sulfate, and evaporated to dryness in vacuo. To a solution of this residue in 32 parts of methanol is added 12 parts of 3 N hydrochloric acid and the mixture allowed to stand at room temperature for about one hour, then neutralized with aqueous potassium bicarbonate and extracted with benzene. This organic extract is washed with water, dried over anhydrous magnesium sulfate, and concentrated to dryness in vacuo. Adsorption of the residue on magnesiated silica, followed by elution with 5% ethyl acetate in benzene and finally recrystallization from acetone-petroleum ether yields pure 13α,17α-dihydroxy-17β-methylgon-4-en-3-one, M.P. 158–159°; $[\alpha]_D = +58°$.

Example 3

To a solution of 1.5 parts of 13α,17α-dihydroxy-17β-methylgon-4-en-3-one and 4 parts of pyridine in 80 parts of methanol is added a solution of 1.5 parts of periodic acid dihydrate in 15 parts of water. This reaction mixture is allowed to stand at room temperature for about one hour, then treated with water and extracted with benzene. The benzene extract is washed with aqueous potassium bicarbonate, dried over anhydrous magnesium sulfate, and evaporated to dryness in vacuo. Recrystallization of the residue from acetone-petroleum ether results in pure 1-(3-oxobutyl)-1,2,3,4,4a,4b,5,6,7,9,10,10a-dodecahydrophenanthrene-2,7-dione, M.P. 102–103°.

Example 4

To a solution of 4.92 parts of 7-methoxy-1-(3-oxobutyl)-1,2,3,4,4a,9,10,10a-octahydrophenanthren-2-one in 240 parts of methanol is added 2 parts of sodium borohydride and the mixture stirred for about 20 minutes. An additional 2 parts of sodium borohydride is then added and the resulting mixture allowed to stand at room temperature for about 18 hours. This mixture is neutralized with 20 parts of acetic acid, then diluted with water and extracted with benzene. The organic layer is washed successively with water and aqueous potassium bicarbonate, dried over anhydrous magnesium sulfate and concentrated to dryness in vacuo to afford the crude product. Crystallization of the residue from ether followed by recrystallization from acetone-petroleum ether yields pure 1-(3-hydroxybutyl)-7-methoxy-1,2,3,4,4a,9,10,10a - octahydrophenanthren-2-ol, M.P. 126–129°; $[\alpha]_D = +58.9°$.

Example 5

To a mixture of 630 parts of liquid ammonia and 80 parts of tertiary butyl alcohol is added 2.26 parts of 1-(3-hydroxybutyl)-7-methoxy-1,2,3,4,4a,9,10,10a - octahydrophenanthren-2-ol dissolved in 35 parts of ether and 45 parts of tetrahydrofuran. This mixture is treated with 6 parts of lithium wire, added in three portions over a period of about 15 minutes. After about two hours, the excess lithium is destroyed by the addition of 25 parts of methanol, the ammonia is evaporated, and benzene and water are added successively. The benzene layer is washed with water, dried over anhydrous magnesium sulfate, and concentrated to dryness under reduced pressure. To a solution of the residue in 80 parts of methanol is added 5 parts of concentrated hydrochloric acid and the resulting reaction mixture heated at reflux for about one hour, cooled, diluted with water, and extracted with benzene. The benzene solution is washed successively with water and aqueous potassium bicarbonate, dried over anhydrous magnesium sulfate, and concentrated to dryness in vacuo. The residue is adsorbed on silica gel, eluted with ethyl acetate, and recrystallized from acetone-petroleum ether to produce pure 1-(3-hydroxybutyl)-2-hydroxy - 1,2,3,4,4a,4b,5,6,7,9,10,10a - dodecahydrophenanthren-7-one, M.P. 179–181°; $[\alpha]_D = +38°$.

Example 6

A mixture of one part of 1-(3-hydroxybutyl)-2-hydroxy - 1,2,3,4,4a,4b,5,6,7,9,10,10a - dodecahydrophenanthren-7-one, 20 parts of pyridine, and 10 parts of acetic anhydride is warmed on the steam bath to achieve solution, then allowed to stand at room temperature for about 16 hours. The reaction mixture is diluted with water and extracted with benzene. This extract is washed successively with dilute hydrochloric acid and water, dried over anhydrous magnesium sulfate and evaported to dryness in vacuo to afford 1-(3-acetoxybutyl)-2-acetoxy-1,2,3,4,4a,4b,5,6,7,9,10,10a - dodecahydrophenanthren-7-one.

The substitution of an equivalent quantity of propionic anhydride in the process of this example results in 1-(3-propionoxybutyl)-2-propionoxy - 1,2,3,4,4a,4b,5,6,7,9,10,10a-dodecahydrophenanthren-7-one.

What is claimed is:

1. A compound of the structural formula

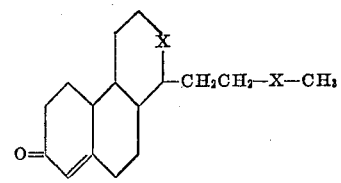

wherein X is selected from the group consisting of carbonyl, hydroxymethylene, and (lower alkanoyl)oxymethylene radicals.

2. 1-(3-oxobutyl)-1,2,3,4,4a,4b,5,6,7,9,10,10a - dodecahydrophenanthrene-2,7-dione.

3. 1-(3 - hydroxybutyl)-2-hydroxy - 1,2,3,4,4a,4b,5,6,7, 9,10,10a-dodecahydrophenanthren-7-one.

4. 1-(3-hydroxybutyl)-7-methoxy - 1,2,3,4,4a,9,10,10a-octahydrophenanthren-2-ol.

5. 3-methoxy-17β-methylgona-1,3,5(10) - triene - 13α, 17α-diol.

6. 13α,17α-dihydroxy-17β-methylgon-4-en-3-one.

References Cited in the file of this patent

Johns: J.A.C.S., vol. 80, pages 6456–57 (1958).